United States Patent [19]

Okafuji et al.

[11] Patent Number: 4,830,693
[45] Date of Patent: May 16, 1989

[54] METHOD FOR FORMING A TIRE AROUND A BEAD

[75] Inventors: Yukitaka Okafuji; Kunio Tajima; Masaharu Sumiuchi; Masami Adachi; Shoji Takahashi, all of Tokyo, Japan

[73] Assignee: Bridgestone Corporation, Tokyo, Japan

[21] Appl. No.: 928,089

[22] Filed: Nov. 7, 1986

[30] Foreign Application Priority Data

Nov. 8, 1985 [JP] Japan .................. 60-250308
Dec. 3, 1985 [JP] Japan .................. 60-272154

[51] Int. Cl.⁴ .............................. B29D 30/32
[52] U.S. Cl. ...................... 156/132; 156/401; 156/406.2
[58] Field of Search ............ 156/401, 406.2, 132, 156/400, 403, 410, 412, 421

[56] References Cited

U.S. PATENT DOCUMENTS

| | | | |
|---|---|---|---|
| 3,490,980 | 1/1970 | Mallory et al. | 156/401 |
| 3,616,059 | 10/1971 | Frazier | 156/401 |
| 3,839,115 | 10/1974 | Leblond et al. | 156/403 |
| 4,145,238 | 3/1979 | Bottasso et al. | 156/401 |
| 4,199,393 | 4/1980 | Brown et al. | 156/401 |
| 4,302,274 | 11/1981 | Enders | 156/401 |
| 4,584,038 | 4/1986 | Enders | 156/401 |

FOREIGN PATENT DOCUMENTS

6535 7/1959 Japan .
9339 7/1960 Japan .

Primary Examiner—Michael W. Ball
Assistant Examiner—Geoffrey L. Knable
Attorney, Agent, or Firm—Sughrue, Mion, Zinn, Macpeak & Seas

[57] ABSTRACT

A method and apparatus for forming a tire in which an inner circumference of a tire carcass is wrapped around a tire bead by being grasped by an expanding air bladder against a stopper plate. The stopper plate, with the bladder still inflated is raised relative to the bead and main tire carcass and then moved into the annular portion of the tire carcass to encase the bead.

1 Claim, 10 Drawing Sheets

METHOD FOR FORMING A TIRE AROUND A BEAD

BACKGROUND OF THE INVENTION

1. Field of the Invention

The present invention relates to a tire forming method and apparatus wherein a tire member is conveyed axially out of the tire forming apparatus after it is bent over a tire forming drum.

2. Background Art

Generally, a tire member such as a carcass is wound on a tire forming drum, a pair of beads are fitted on the tire member, and the portions of the tire member, which extend outside the beads in the axial direction of the tire forming drum, are bent over around the beads, and the tire member thus bent around the beads is conveyed out of the apparatus to form a pneumatic tire.

When such tire portion is conventionally bent over, the portion is pushed and spread outwards in the radial direction of the tire forming drum by a bladder, for example, and a can is moved toward the axially middle part of the drum to push down the bladder to bend over the portion around the bead. When the bent-over tire member is conveyed axially, the diameter of an expansible and compressible conveyance ring is reduced to hold the tire member on the peripheral surface thereof, and the ring is then moved in the axial direction of the drum to convey the tire member axially away from the drum.

In a conventional method of bending over a portion of a tire member, a bladder disposed radially inside the portion is first expanded to push and spread the member portion in the radial direction of the tire member, and a can is then moved toward the axially middle part of a tire forming drum by an oil or air cylinder to push down the expanded bladder, so as to bend over the portion around a bead.

In another conventional method of bending over portion of a tire member, the portion is pushed and spread in the radial direction of the tire member by a first bladder, and a second bladder provided outside the first bladder in the axial direction of the tire member is expanded to push down the first bladder toward the axially middle part of a tire forming drum, so as to bend over the portion around a bead.

Since the bending-over of the tire member and the discharge of the tire member from the drum are performed by the can and the conveyance ring, respectively, it is difficult to control the bending-over and the axial discharge of the tire member. Since a waiting time is required to prevent the interference of the can and the ring, the efficiency of the formation of the pneumatic tire is low. Since the can and the ring need to be separately provided to achieve bending-over of the tire member and the axial discharge, the cost of equipment is high.

Since high-pressure oil or air needs to be supplied to the cylinder to drive the can in the former conventional method, the cost of equipment is high and the strength of the equipment needs to be high. If a bending over condition such as the length of the bent-over portion changes, the quality of the portion bent over becomes irregular.

Since high-pressure (6 to 7 kg/cm$^2$) air needs to be supplied to the first and the second bladders in the latter conventional method, the cost of equipment is high. When a bending-over condition such as the length of the bent-over portion changes, the quality of the portion bent over becomes irregular. If the pressure in the first and the second bladders and the timing of the pressurization of the bladders become even slightly improper, the quality of the portion bent over drops.

SUMMARY OF THE INVENTION

According to the present invention, the above mentioned problems are solved by providing, as a first embodiment, a process in which the portion of the tire member wound on the tire forming drum is pushed and spread by the bladder to pinch the outer end of the tire member portion between the bladder and a cylindrical body, and the cylindrical body is then moved toward the axially middle part of the tire forming drum to bend over the portion of the tire member around the bead; and a process in which the bladder is axially conveyed from between the tire member and the cylindrical body, and the diameter of the cylindrical body is then reduced to hold the bent-over tire member on the peripheral surface thereof to convey out the member from the tire forming drum.

According to a second embodiment of the present invention, the above-mentioned problems can be solved by providing an improved method and a device for bending over a tire member wound on a tire forming drum. In the method, the portion of the tire member, which is located between the side edge of the tire member and a bead, is bent over around the bead by a bladder. The bent-over portion is surrounded by a cylindrical body coaxial with the tire member, the bladder is expanded to push and spread the portion outwards in the radial direction of the tire forming drum to pinch the outer end of the portion between the bladder and the cylindrical body, and the cylindrical body is moved toward the axially middle part of the tire forming drum to deform and move the bladder to bend over the portion around the bead while pinching the outer end of the portion between the bladder and the cylindrical body. In the device, the portion of the tire member, which is located between the side edge of the tire member and the bead, is bent over around the bead. The device comprises the bladder which is made of rubber and disposed inside the portion of the tire member in the radial direction of the tire forming drum and can be expanded, the cylindrical body whose diameter can be increased and decreased and which is coaxial with the tire member and can surround the portion of the tire member outside the portion in the radial direction of the tire forming drum, and a means for moving the cylindrical body in the axial direction of the drum.

Embodiments of the present invention are hereafter described with reference to the drawings.

DETAILED DESCRIPTION OF THE PREFERRED EMBODIMENTS

Figure 1:
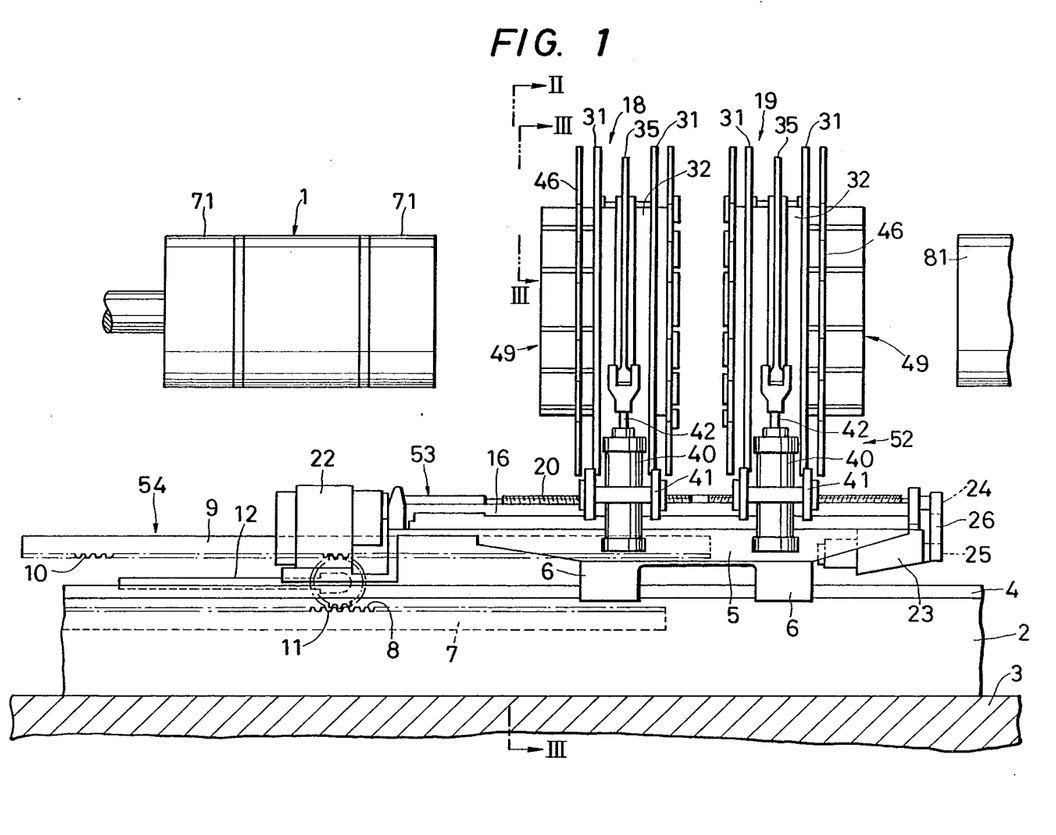
FIG. 1 is a side electrical view of an apparatus forming a preferred embodiment of the present invention.
Figure 2:
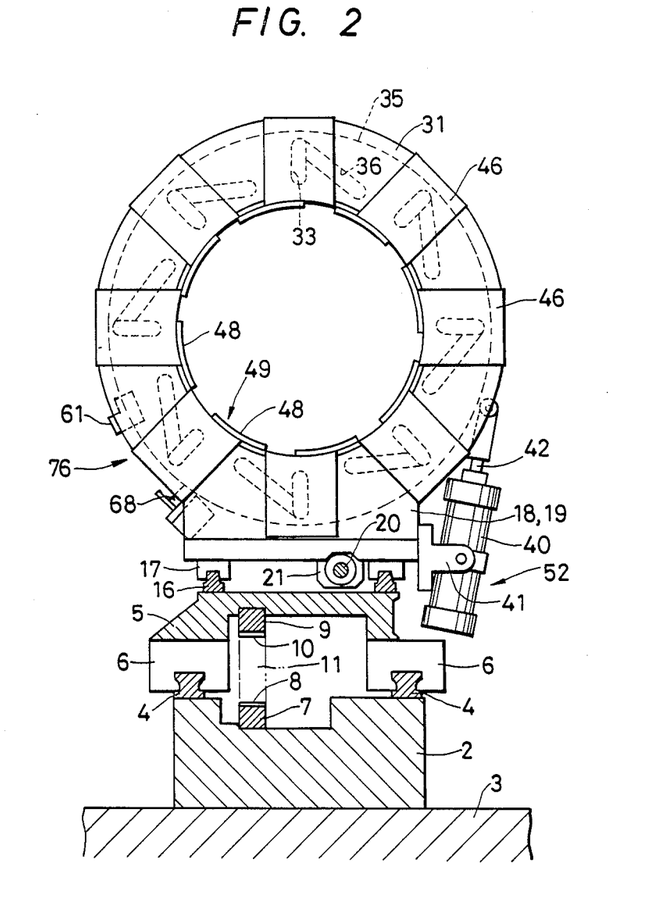
FIG. 2 is a vertical section of the apparatus of FIG. 1, taken about line II—II.

FIGS. 1 and 2 show, for a first embodiment of the invention, a tire forming drum 1 for performing the first steps in the formation of a radial tire. The drum 1 is mounted for rotation around a horizontal axis. The diameter of the drum 1 can be increased and decreased. A bed 2 is provided on a floor 3. Rails 4 are laid on the bed 2 in parallel with the axis of the tire forming drum 1. A moving frame 5 is mounted for movement on the rails 4, with linear slide bearings 6 slidably supported on the rails 4. A lower rack 7 extends in parallel with the rails 4 and is secured to the bed 2. Teeth 8 are provided on the top of the lower rack 7. An upper rack 9 extends in parallel with the lower rack 7 and is secured to the moving frame 5. Teeth 10 are provided on the bottom of the upper rack 9. A pinion 11 is provided between the upper and the lower racks 9 and 7 so that the pinion is engaged with the teeth 10 and 8 of respective racks and coupled to the tip of the piston rod 12 of a cylinder (not shown). The cylinder is operated to move the frame 5 in the axial direction of the tire forming drum 1, at a speed twice as high as the moving speed of the piston rod 12, while the frame 5 is guided on the rails 4. Rails 16 are laid on the moving frame 5 in parallel with the rails 4. A pair of stands 18 and 19 are movably supported on the rails 16 by linear slide bearings 17. A screw shaft 20 is movably supported by the moving frame 5, in parallel with the rails 16. Both the axial end portions of the screw shaft 20 are provided with threads wound in mutually reverse directions. The threaded end portions of the screw shaft 20 are threadably engaged in threaded blocks 21 provided on the stands 18 and 19 so that the stands are moved toward or away from each other to the same degree when the screw shaft 20 is rotated. A motor 22 imparts a turning force to the screw shaft 20. An encoder 23 functions to detect the rotational frequency of the screw shaft 20 through pulleys 24 and 25 and a belt to control the operation of the motor 22.

Each of the stands 18 and 19 comprises a pair of rings 31, 31. Cylindrical portions 32 couple the radially inner edge portions of the rings 31 to each other as shown in FIGS. 1, 2, 3 and 4. Each ring 31 has a plurality of radial holes 33, (eight in this embodiment) each having a long cross section and extending in the radial direction of the ring. The ends of shafts 34 are inserted in the holes 33 so that the shafts can be moved along the edges of the holes 33. A rotary annular plate 35 having holes 36, each of which has a long cross section and hose number is equal to that of the holes 33, is rotatably supported on the peripheral surface of each cylindrical portion 32 of the rings 31. The holes 36 of the rotary plate 35 extend obliquely to the radial direction thereof. Rollers 37 attached to the central portions of the shaft 34 are rotatably inserted in the holes 36.

Figure 3:
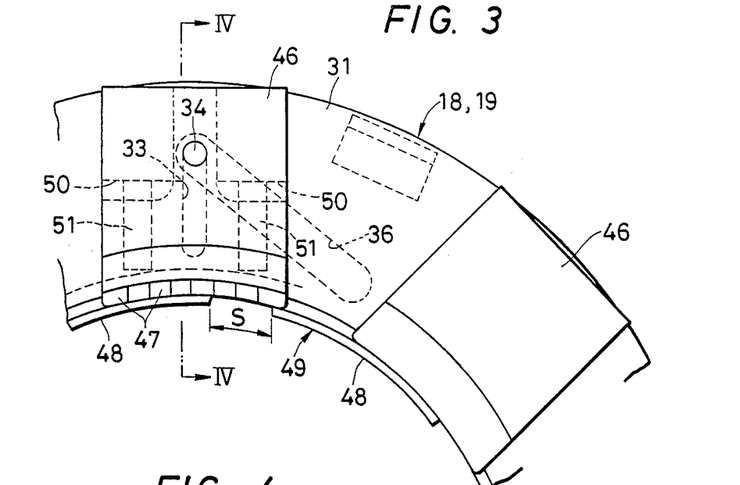
FIG. 3 is an elongated sectional section of a portion of the apparatus of FIG. 1, taken about line III—III.
Figure 4:
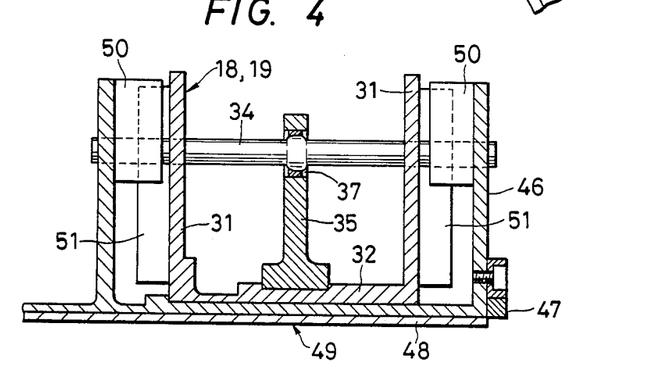
FIG. 4 is a sectional section taken about lines IV—IV of FIG. 3.
Figure 4A:
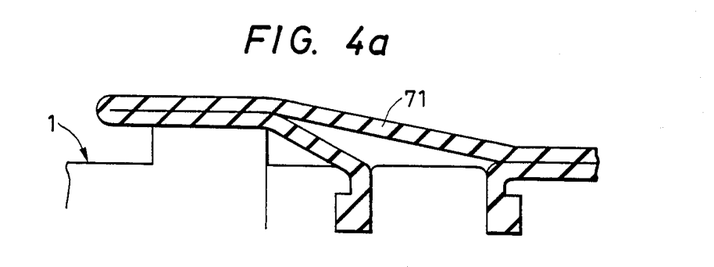
FIG. 4a is a section view of a portion of the drum and an expandable bladder carried therey.

Cylinders 40 are coupled to the stands 18 and 19 through brackets 41. The tips of piston rods 42 of the cylinders 40 are coupled to the rotary plates 35 of the stands 18 and 19. When the rotary plate 35 is rotated relative to the ring 31 by operating the cylinder 40, the shafts 34 are synchronously moved in the radial direction of the plate 35 because of the wedge effects of the holes 33 and 36 acting on the shafts 34.

The same number of sliders 46 as the holes 33 are fitted into each of the stands 18 and 19 outwards in the radial direction thereof. The ends of the shafts 34 are secured to the sliders 46. Holders 47 made of permanent magnets for attracting beads are secured to the radially inner portions of the mutually approaching sides of the sliders 46. The butts of arc-shaped segmental plates 48 made of a spring material are secured to the radially inside surfaces of the sliders 46 so that the tips of the segmental plates 48 are slidably placed in contact with the radially inside surfaces of the adjacent sliders 46. The sliders 46, the holders 47 and the segmental plates 48 constitute cylindrical bodies indicated generally at 49, respectively.

Guide blocks 50 are secured to the side surfaces of the sliders 46, which face the rings 31. Guide bars 51 parallel with each other and extending nearly in the radial direction of the ring 31 are secured to the side surface of the ring 31 which faces the slider 46. Since the guide bars 51 are slidably fitted in the guide blocks 50, the sliders 46 are supported in the stands 18 and 19 so that the sliders can be moved in the radial directions of the stands.

When the rotary plate 35 is rotated relative to the ring 31, the cylindrical body 49 is expanded or compressed as the body 49 is kept cylindrical.

The holes 33 and 36, the shafts 34, the rotary plate 35 and the cylinder 40 constitute, as a whole, a means generally indicated at 52 for expanding and compressing the cylindrical body 49.

The screw shaft 2, the threaded blocks 21 and the motor 22 constitute, as a whole, a means indicated generally at 53 for moving the cylindrical bodies 49 both toward and away from each other.

The lower rack 7, the upper rack 9 and the cylinder having the piston rod 12 constitute, as a whole, a means indicated generally at 54 for moving the cylindrical bodies 49 together in the same axial direction of the tire forming drum 1.

Figure 5:
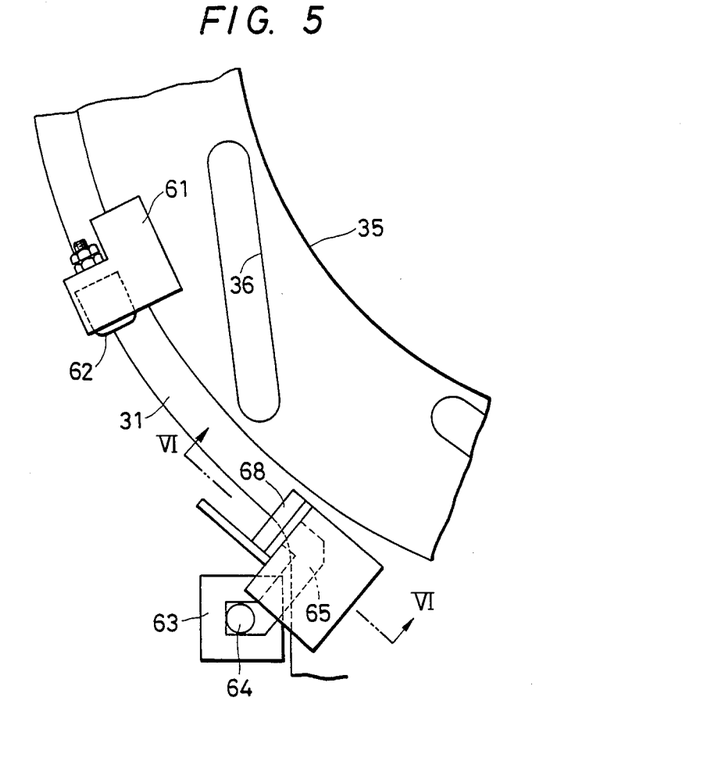
FIG. 5 is an end view of two portions of the apparatus of FIG. 1.
Figure 6:
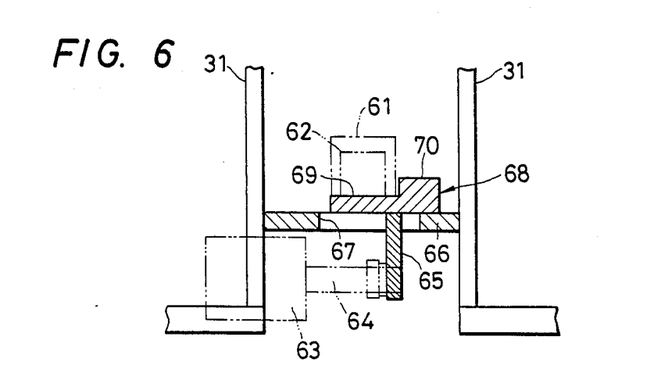
FIG. 6 is a sectional view of a portion of the apparatus of FIG. 5, taken about line VI—VI.

FIGS. 2, 5 and 6 show a stopper 61 secured to the rotary plate 35 and projecting from that plate. The stopper 61 is fitted with a damper 62 made of rubber.

Cylinders 63 extending in the axial direction of the tire forming drum 1 are secured to the cylindrical portions 32 of the stands 18 and 19. Coupling plates 65 are secured to the tips of the piston rods 64 of the cylinders 63 and extend through holes 67 having a long cross section and provided in plates 66 secured to the rings 31. Stopper receivers 68, with which the dampers 62 are brought into contact, are secured to the tips of the coupling plates 65. Each stopper receiver 68 comprises a thin portion 69 and a thick portion 70 (FIG. 6). Switch over can be performed to bring the damper 62 into contact with either the thin portion 69 or the thick portion 70 when the cylinder 63 is operated to move the stopper receiver 68. When the rotary plate 35 is rotated so that the damper 62 is brought into contact with the thick portion 70, the slider 46 is moved a lesser degree, radially inwards so that the diameter of the cylindrical body 49 is relatively large. When the rotary plate 35 is rotated so that the damper 62 is brought into contact with the thin portion 69, the slider 64 is moved by a large degree, radially inwards so that the diameter of the cylindrical body 49 is reduced to its maximum. The stopper 61, the damper 62, the cylinder 63 and the stopper receiver 68 constitute, as a whole, a positioning means, indicated generally of 76, for determing the radial position of the cylindrical body 49.

FIGS. 1 and 4 show bladders 71 provided at both axial ends of the tire forming drum 1. Both the edge portions of each bladder 71 are fitted in a sealed state on the tire forming drum 1.

A second tire forming drum 81 is provided in front of the tire forming drum 1 coaxially therewith so as to perform the second step in the formation of the tire.

Figure 7A:
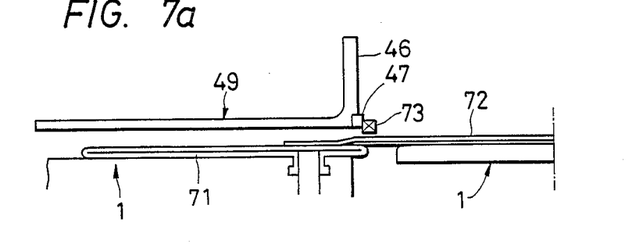
FIG. 7a–7d are schematic views in sequence of the apparatus of FIG. 1 illustrating the process of forming a tire member in accordance with the present investors.

The operation in the first embodiment of the present invention is hereafter described. A tire member 72 such as an inner liner and a carcass ply is first wound on the peripheral surface of the tire forming drum 1, as shown in FIG. 7 (a). At that time, the slider 46 is at a standstill in its radially outermost, waiting position, as shown in FIG. 4, the segmental plates 48 are at a prescribed distance "S" from each other in the circumferential direction, as shown in FIG. 3, and the bladders 71 are not filled with air and remain compressed flat. The cylinders 40 are then operated to project their piston rods 42 to rotate the rotary plates 35 to synchronously move the shafts 34 inwards in the radial directions of the stands 18 and 19 because of the wedge effects of the holes 33 and 36 on the shafts 34. At that time, the tip of each segmental plate 48 slides on the radially inside surface of the adjacent slider 46 while the segmental plate is deformed so that its radius of curvature is decreased. As a result, the distance "S" is reduced. The diameter of each cylindrical body 49 is thus decreased while it is kept cylindrical. When the damper 62 comes into contact with the thin portion 29 of the stopper receiver 68, the rotation of the rotary plate 35 is stopped. As a result, the diameter of the cylindrical body 49 is reduced. In that state, the beads 73 are attached the holders 47. The cylinder is then operated to retract the piston rod 12 to move the frame 5 to such a position that both the cylindrical bodies 49 surround both the ends of the tire forming drum 1.

Figure 7B:
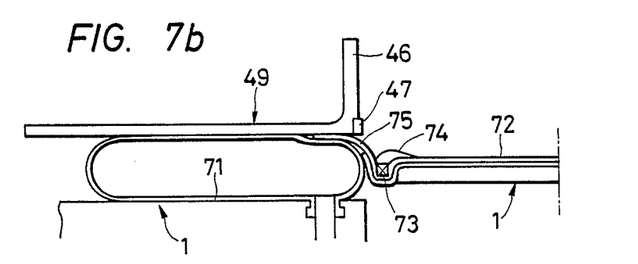

The piston rods 42 of the cylinders 40 are thereafter retracted to move the sliders outwards in the radial direction of the stand 18 and 19, as shown in FIG. 7(b). As a result, the beads 73 are set at both axial ends of the tire member 72. At that time, fillers 74 are also similarly set. The portions 75 of the tire member 72, which extend outside the beads 73 in the axial direction of the tire forming drum 1, are thus set in position to be bent over. The piston rods 64 of the cylinders 63 are then retraced so that the stopper receivers 68 are moved to bring the dampers 62 into contact with the thick portions 70 of the stopper receivers 68. The piston rods 42 of the cylinders 40 are thereafter projected again so that the rotary plates 35 are rotated until the dampers 62 are brought into contact with the thick portions 70 of the stopper receiver 68. As a result, the sliders 46 are again moved inwards in the radial directions of the stand 18 and 19 so that the diameters of the cylindrical bodies 49 are increased. Low-pressure air is then applied to the bladders 71 to expand them to gradually push and spread the portions 75 of the tire member 72, as a whole, to pinch the axially outer ends of the portions 75 between the bladders 71 and the cylindrical bodies 49.

Figure 7C:
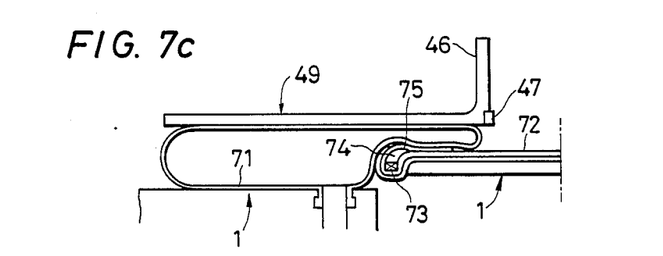

The motor 22 is thereafter operated while being accurately controlled by an encoder 23, so as to rotate the screw shaft 20 to cause both the stands 18 and 19 to approach each other by the same length together with the cylindrical bodies 49 toward the axially middle part of the tire forming drum 1 while the stands 18 and 19 are guided on the rails 16. At that time, since the bladders 71 are tightly fitted on the inside surface of the cylindrical bodies 49 so that the bladders cannot slip thereon, the bladders are deformed while rolling toward the axially middle part of the tire forming drum 1, as showing FIG. 7(c). For that reason, the outer ends of both the portions 75 to be bent over are pulled toward the axially middle part of the tire forming drum as the portions 75 remain pinched between the bladders 71 and the cylindrical bodies 49, so that the portions 75 are gradually bent over around the beads 73. When the cylindrical bodies 49 are further axially moved, the bladders 71 are deformed into the narrow gaps between the tire forming drum 1 and the cylindrical bodies to further bend over the portions 75. When the bent-over portions 75 are released from being pinched between the cylindrical bodies 49 and the bladders 71, the bending-over of the tire member 72 about beads 73 is completed and the operation of the motor 22 is stopped.

Figure 7D:
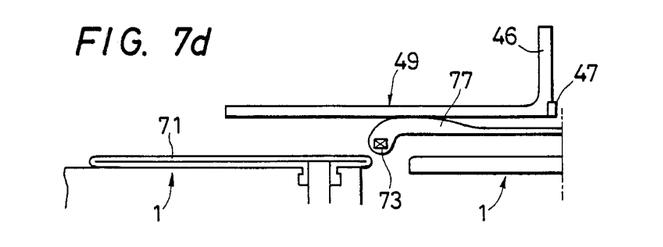

After that, the cylinders 40 are operated to increase the diameters of the cylindrical bodies 49 to a value corresponding to their waiting positions, the air is discharged out of the bladders 71, and the bladders are moved out from between the tire member 72 and the cylindrical bodies 49 and returned to the initial flat state, as showing FIG. 7(d). The motor 22 is then operated again to move the stands 18 and 19 toward each other. When the stands 18 and 19 are moved toward each other to such an extent that there is a prescribed gap between the cylindrical bodies 49, the operation of the motor 22 is stopped. The piston rods 64 of the cylinders 63 are then projected to move the stopper receivers 68 in order to bring the dampers 62 into contact with the thin portions 69 of the stopper receivers 68. The cylinders 40 are then operated to reduce the diameters of the cylindrical bodies 49. At that time, since the outside diameter of the bent-over tire member 72 or 77 is between the inside diameter of the expanded cylindrical bodies 49 and that of the compressed cylindrical bodies 49, the cylindrical bodies come into contact with the peripheral surface of the bent-over tire member 77 before the dampers 62 come into contact with the thin portions 69 of the stopper receivers 68. Since the rigidity of the bent-over tire member 77 is enhanced by the beads 73 so that it is difficult to deform the bent-over tire member, the cylindrical bodies 49 are stopped in contact with the peripheral surface of the bent-over tire member so that the cylindrical bodies are kept at a medium diameter. As a result, the bent-over tire member 77 is held on the peripheral surface thereof by the cylindrical bodies 49.

After that, the diameter of the tire forming drum 1 is reduced. The piston rod 12 of the cylinder is then protruded to convey out the bent-over tire member 77 from the tire forming drum 1. The bent-over tire member 77 is then conveyed to and set on the second tire forming drum 81 by moving the frame 5. Since the bent-over tire member 77 is thus directly conveyed axially from the tire forming drum 1 to the second tire forming drum 81 coaxial therewith, as the bent-over tire member remains held on the peripheral surface thereof by the cylindrical bodies 49, the uniformity of the tire as a product is enhanced. A belt and a tread are wound on the bent-over tire member 77 on the second tire for mind rum 81 as the bent-over tire member is toroidally deformed, so that an unfinished tire is manufactured.

If the size of the tire is altered, the attached positions of the stopper 61 are modified to change the radial positions of the cylindrical bodies 49.

In order to bend over each the outer end of the portion of the tire member, the outer end of the portion is pinched between the cylindrical body and the bladder, and the cylindrical body is then moved toward the axial middle part of the tire forming drum. In order to discharge the tire member axially from the rim, the diameter of the cylindrical body used to bend over the portion of the tire member is reduced to hold the tire member on the peripheral surface thereof. Therefore, the same cylindrical body is used not only to bend over the tire member but also axially discharge it from the drum. For that reason, according to the present invention, the control of operation is facilitate, lost time is eliminated to enhance the efficiency of the formation of the tire, and the cost of equipment is diminished.

Figure 8:
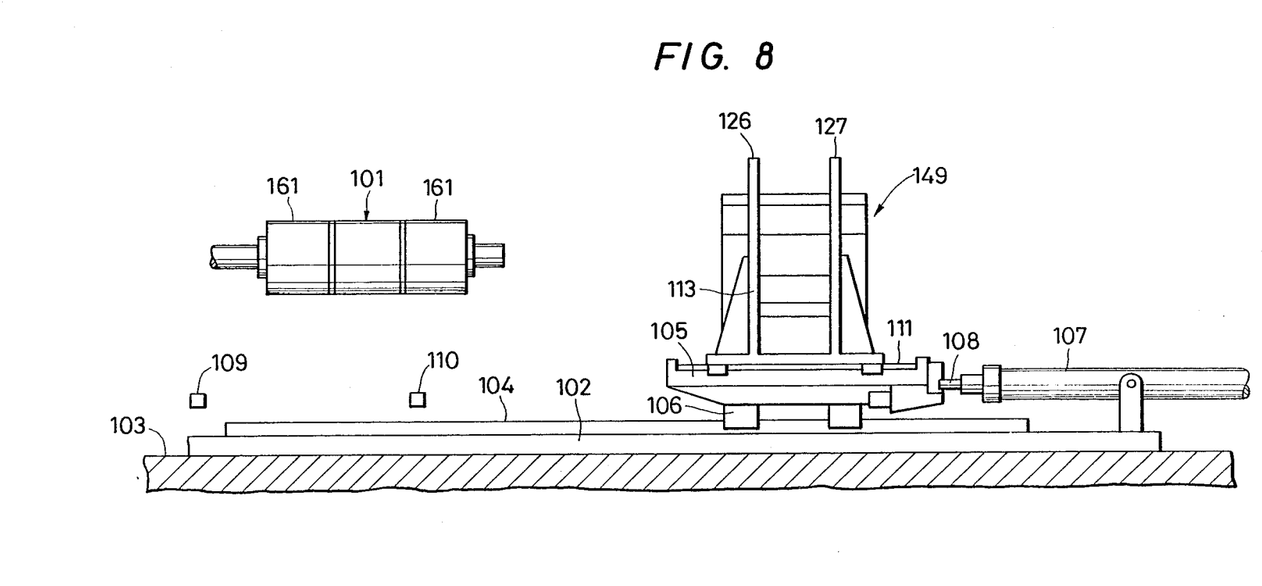
FIG. 8 is a side elevational view of a apparatus forming a second embodiment of the present invention.

FIG. 8 shows, in a second embodiment of the invention, a tire forming drum 101 which can be rotated around a horizontal axis and whose diameter can be increased and decreased. A bed 102 is provided on a floor 103. Rails 104 are laid on the bed 102 parallel to the axis of the tire forming drum 101. A moving frame 105 can be moved on the rails 104, and is provided with linear slide bearings 106 slidably supported on the rails 104. A cylinder 107 is supported on the bed 102 and provided with a brake mechanism. The tip of a piston rod 108 of a cylinder 107 is couple to the moving frame 105. The cylinder 107 is operated to project or retract the piston rod 108 to move the frame 105 toward or away from the tire forming drum 101. Sensors 109 and 110 detect the position of the moving frame 105 to send signals to a controller (not shown) to regulate the operation of the cylinder 107.

Figure 9:
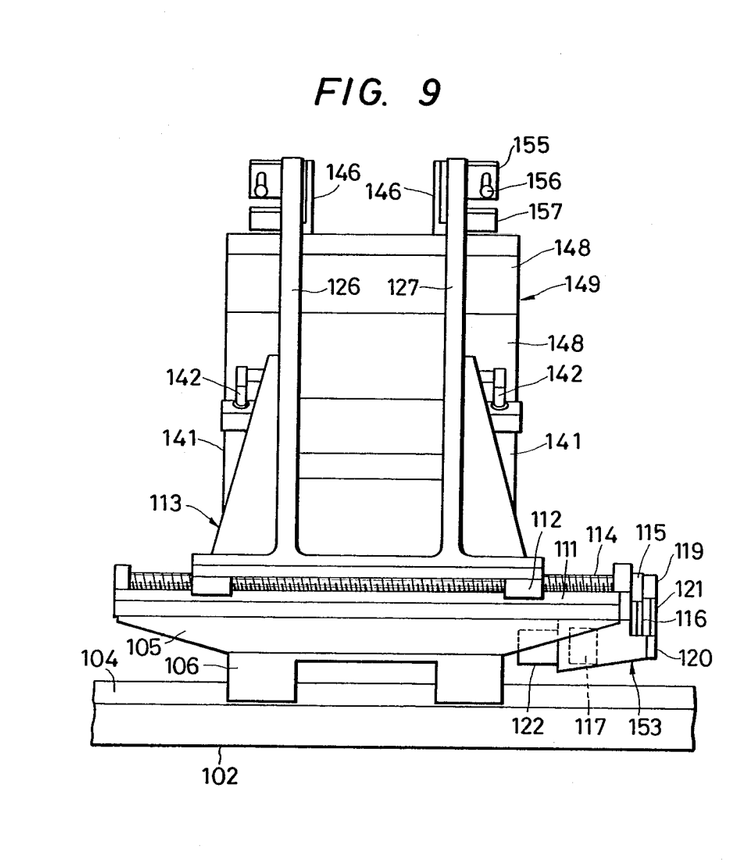
FIG. 9 is an enlarged side elevational view of a portion of the apparatus of FIG. 8.
Figure 10:
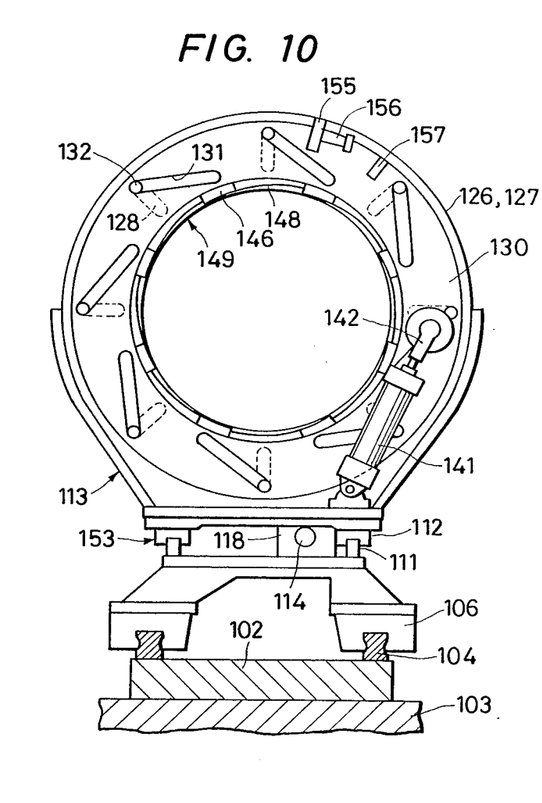
FIG. 10 is an end view of the portion of the apparatus shown in FIG. 9.

Rails 111, parallel to the rails 104, are laid on the moving frame 105, as shown in FIGS. 9 and 10. A stand 113 is movably supported by linear slide bearings 112 on the rails 111. A screw shaft 112 parallel to the rails 111 is rotatably supported on the moving frame 105. The rotation of a motor 117 is transmitted to the screw shaft 114 through a pulley 115 and a belt 116. The screw shaft 114 is engaged in a threaded block 118 secured to the stand 113, so that the stand is moved on the rails 111 when the screw shaft 114 is rotated. The rotation of the screw shaft 114 is transmitted to an encoder 122 through pulleys 119 and 120 and a belt 121 to accurately measure and control the rotation of the motor 117 or the position of the stand 113.

The stand 113 has vertical rings 126 and 127 spaced from each other in the longitudinal direction of the rails 111 and coaxial with each other.

Each of the rings 126 and 127 has a plurality (eight in this embodiment) of elongated holes 128 extending in the radial direction of the ring, as showing FIGS. 10, 11, 12 and 13. Shafts 129 are inserted in the holes 128 so that the shafts can be moved along the edges on the holes. Rotary annular plates 130 are provided outside the rings 126 and 127 in the axial direction thereof so that the rotary plates are coaxial with the rings 126 and 127. Each rotary plate 130 has the same number of elongated holes 131 as the elongated holes 128. The holes 131 extend obliquely to the radial direction of the rotary plate 130. Rollers, 132 attached to the shafts 129, are rotatably inserted in the holes 131. Guide grooves 133 are provided in the inside circumferential surfaces of the rings 126 ad 127. Rollers 135, rotatably supported by shafts 134 on the rotary plates 130, are in rolling contact with the surfaces of the guide grooves 133 so that the rotary plates 130 are rotatably supported by the rings 126 and 127.

Figure 11:
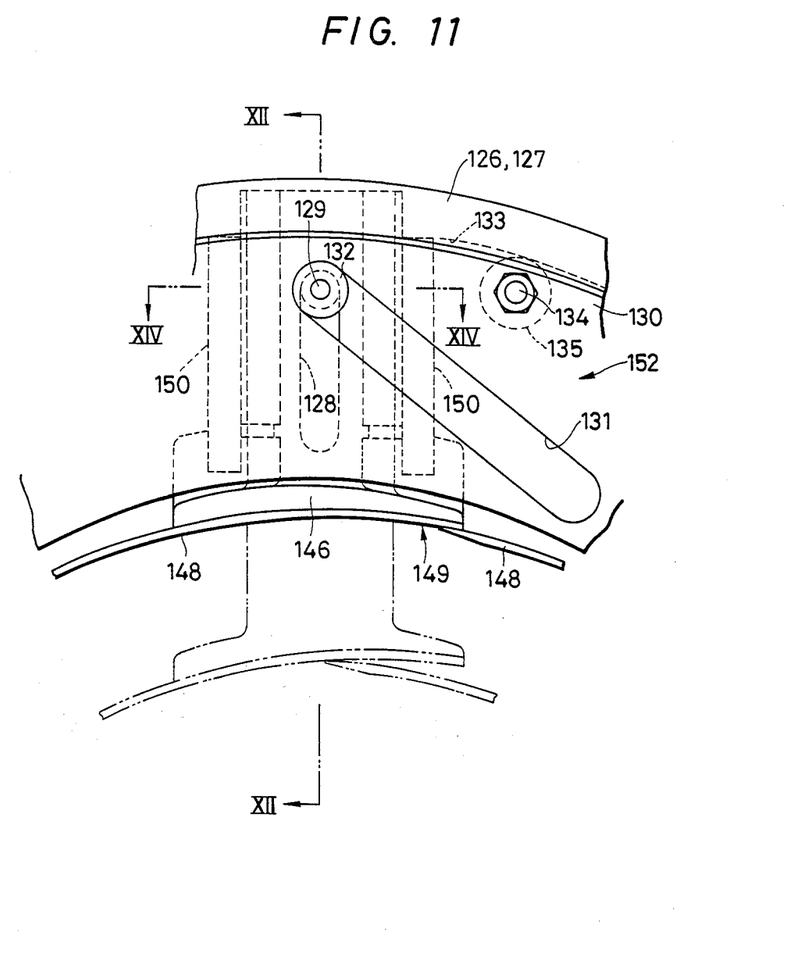
FIG. 11 is an enlarged electrical view of a portion of the apparatus of FIG. 10.
Figure 12:
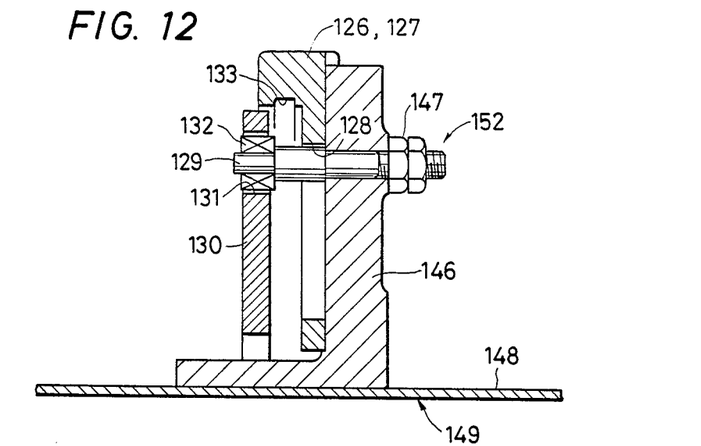
FIG. 12 is a sectional view of the apparatus of FIG. 11, taken about the line XII—XII.
Figure 13:
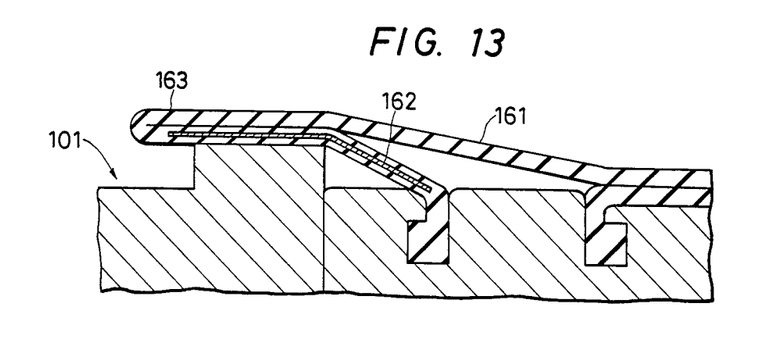
FIG. 13 is a longitudinal sectional view of a portion of the drum shown in FIG. 8.

The butts of cylinder 141 are rotatably coupled to the lower-most portion of the stand 113. The front ends of piston rods 142 of the cylinders 141 are rotatably coupled to the rotary plates 130. As a result, when the cylinders 141 are operated, the rotary plates 130 are rotated relative to the rings 126 and 127 so that the shafts 129 are synchronously moved in the radial direction of the rings because of the wedge effects of the elogated holes 128 and 131.

L-shaped sliders 146 are disposed inside the rings 126 and 127 in the axial direction thereof and secured to the shafts 129 by double nuts 147. The butts of arc-shaped segmental plates 148 made of a spring material are secured to the radially inside surfaces of the sliders 146. The tip of each segmental plate 148 is overlapped with the butt of the adjacent segmental plate 148. The plurality of segmental plates 148 constitute, as a whole, a cylindrical body 149 coaxial with a tire member 171 described hereinafter.

Figure 14:
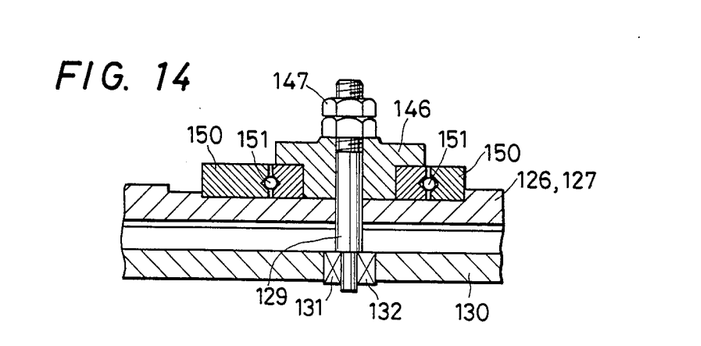
FIG. 14 is a sectional view of the expansion and compression means for the cylindrical body of the apparatus of FIG. 8.

A pair of guides 150, which extend in the radial direction of the stand 113, are attached to each of the rings 126 and 127 at both the circumferential ends of each slider 146. Bearings 151 are interposed between the slider 146 and the guides 150. When the rotary plates 130 are rotated relative to the rings 126 and 127 and the sliders 146 are moving the radial direction of the stand 113, the cylindrical body 149 is expanded or compressed while maintained cylindrical. The holes 128 and 131, the shafts 129, the rotary plates 130, the cylinders 141 and the sliders 146 constitute, as a whole, expansion and compression means 152 for expanding and compressing the cylindrical body 149. The screw shaft 114 and the motor 117 constitute, as a whole, a moving means 153 for moving the cylindrical body 149 in the axial direction of the tire forming drum 11.

Plates 155 are attached to the rings 126 and 127, as showing FIGS. 9 and 10. Stopper bolts 156 are screwed in the plates 155. Stopper plates 157 are secured to the rotary plates 130. The stopper plates 157 come into contact with the stopper bolts 156 to limit the rotation of the rotary plates 130. The limitation of the rotation can be regulated by adjusting the screwed positions of the stopper bolts 156. The adjustment of the screwed positions can be performed either manually or by the rotation of a motor (not shown) coupled to the stopper bolts 156.

Figure 15A:
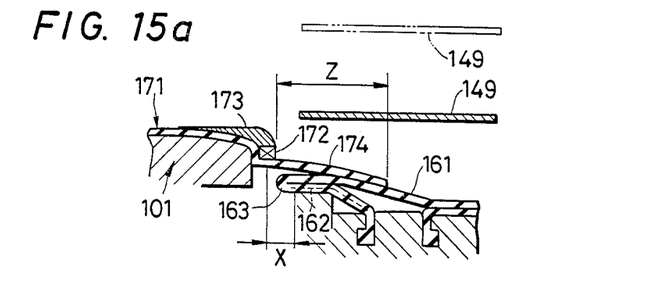
FIGS. 15a–15d are sequential sectional views illustrating the method of bending over the portion of the tire member about a bead using the apparatus of FIGS. 8–14.

Bladders 161 are provided at both the axial ends of the tire forming drum 101, as shown in FIGS. 8 and 12. Both the edges of each bladder 161 are attached in a sealed state to the tire forming drum 101. Each bladder 161 is made of rubber as a whole. A reinforcing layer 162 made of textile, steel or the like is embedded in the edge portion of each bladder 161 near the axially middle part of the tire forming drum 11. It is preferable that the outer edge 163 of the reinforcing layer 162 is separated at a distance X of zero to 0.5 cm from a bead 172 in the axial direction of the bladder 161, as shown in FIG. 15a, because the bladder is likely to be bent to an excessive angle at the outer edge of the reinforcing layer and damaged at the time of expansion of the bladder if the distance X is less than 0 cm, and because the bladder 161 is deformed as an arc and comes into contact with the tire member 171 at the time of the expansion of the bladder if the distance X is more than 0.5 cm.

The operation in the second embodiment of the present invention is hereafter described. The tire member 171 such as a carcass ply is first wound on the peripheral surface of the tire forming drum 101 with its diameter increased, as shown in FIG. 15a. At that time, air is not supplied to the bladders 161, so that the bladders are compressed flat. Pairs of beads 172 and fillers 173 are set at both the axial ends of the tire member 171, respectively, so that the portion 174 of the tire member 171, which is located between the side edge of the tire member and the bead 17, is set in order to be bent over, and the bladder 161 is placed inside the portion 172 in the radial direction of the tire member. The cylinder 107 is then operated to protrude the piston rod 108 to move the frame 105 toward the tire forming drum 101 while the frame 105 is guided on the rails 104. When the frame 105 is moved to a prescribed position, sensor 110 sends out a signal to the cylinder 107 through the controller to brake the operation of the cylinder. At that time, the cylindrical body 149 surrounds the portion 174 outside it in the radial direction of the tire member 171. The cylinder 41 is then operated to rotate the rotary plate 130 until the stopper plate 157 comes into contact with the stopper bolt 156. Since the rotary plate 130 is thus rotated, the shafts 129 are synchronously moved inwards in the radial direction of the tire member 171 because of the wedge effects of the elongated holes 128 and 131 so that the cylindrical body 149 is compressed from a diameter shown by dotted lines in FIG. 15a to a diameter shown by full lines therein. At that time, each segmental plate 148 slips on the adjacent segmental plate 248 and is elastically deformed to decrease its radius of curvature as the segmental plates 148 are kept, as a whole, cylindrical.

Figure 15B:
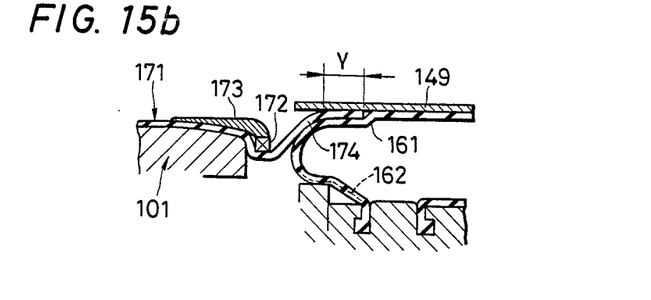

After that, air at a low pressure of abut $0.8 \text{ kg/cm}^2$ is supplied the bladder 61 to expand it, as shown in FIG. 15b. At that time, since the reinforcing layer 162 is embedded in the edge portion of the bladder 161, the rigidity of the edge portion is higher than that of the other portion of the bladder so that the edge portion containing the reinforcing layer 162 is kept almost parallel to the axis of the tire for mind drum 101 even though the bladder 161 is expanded. For that reason, the bladders 161 is expanded so that it is bent almost square at the outer edge 163 of the reinforcing layer 162 located very close to the bead 172. As a result, the portion 174 begins to be bent over by the portion of the bladder 161 which is bent almost equal at a point very close to a bending-over starting point (the position of the bead 172). When the bladder 161 is expanded further, the portion 174 is gradually pushed and spread as a whole so that the outer end of the member portion 174 is pinched between the bladder 161 and the cylindrical body 149. At that time, it is preferable that the length Y of the portion 174 pinched between the bladder 161 and the cylindrical body 149 is equal to between 3 to 70% of the total length Z of the the member portion 174, because the portion 174 is likely to move out from between the bladder 161 and the cylindrical body 149 if the length Y is less than 3% of the total length Z, and because the gap between the cylindrical body 149 and the tire forming drum 101 is too small for the bladder 161 to come in between the cylindrical body and the tire forming drum if the length Y is more than 70% of the total length Z.

Figure 15C:
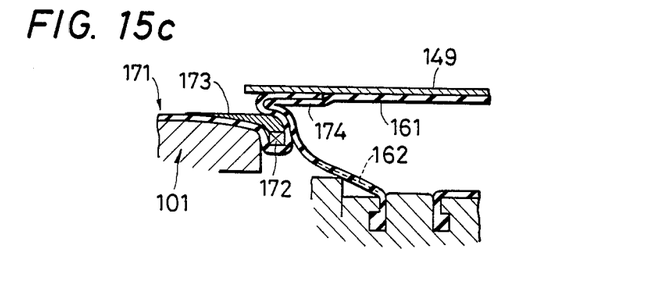

After that, the motor 117 is operated while being accurately controlled by the encoder 122, so as to rotate the screw shaft 114 to move the stand 113 and the cylindrical body 149 together toward the axially middle part of the tire forming drum 101 while the stand and the cylindrical body are guided on the rails 111, as shown in FIG. 15c. At that time, the bladder 161 cannot slip because of tight contact with the inside surface of the cylindrical body 149, so that the bladder is deformed and moved while rolling toward the axially middle part of the tire forming drum 101. For that reason, the outer end of the portion 174 is pulled toward the axially middle part of the drum 101 while being pinched between the cylindrical body 149 and the bladder 161, so that the portion 174 is gradually turned and bent over around the bead 172. The portion 174 is thus gradually pushed onto the bead 172 and the filler 173 by the deformed and moved bladder 161 so that the portion 74 is placed into tight contact with the bead and the filler while the air is being discharged.

Figure 15D:
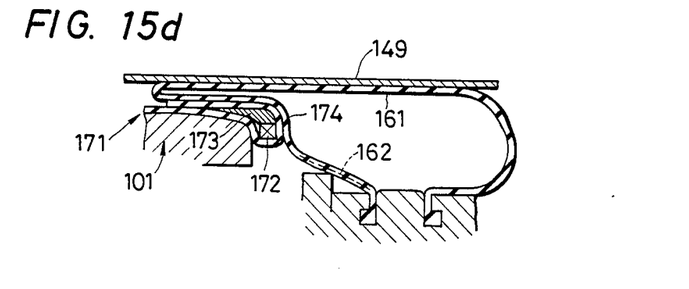

When the cylindrical body 149 is moved further toward the axially middle part of the tire forming drum 101, as showing FIG. 15d, the bladder 161 is inserted into the narrow gap between the cylindrical body 149 and the tire forming drum 101 while the bladder is being deformed, so as to further bend over the tire member portion 174. When the inserted quantity of the bladder 161 has become almost equal to the length of the bent-over portion 173, the portion is released from being pinched between the cylindrical body 149 and the bladder 161, with that portion being completely bent over.

While the tire member portion 174 is being bent over, its outer end is pinched between the cylindrical body 149 and the bladder 161 and the portion 174 is pushed from the inside by the internal pressure of the bladder so that a tensile force acts to the portion 174 in the axial direction of the tire forming drum 101. For that reason, any wrinkles extending in the portion 174 in the circumferential direction thereof are smoothed out, so that the quality of the portion 174 bent over is enhanced.

After the portion 174 is bent over at the right-hand side of the tire forming drum 101 shown in FIG. 1, as described above, the moving frame 105 is moved forth further until it is detected by the sensor 109, so as to bend over another portion 174 at the left-hand side of the tire forming drum 101 as well.

If the diameter of the tire member 171, the length of the portion 174 or the like is changed, the cylindrical body 149 is expanded or compressed to an appropriate diameter. The quality of the tire being built including the tire member is thus prevented from becoming irregular due to such change.

The operation of the method and the device, forming a second embodiment of the invention, is hereafter summarized. The portion to be bent over is first surrounded by the cylindrical body coaxial therewith, outside the portion in the radial direction of the tire forming drum. In that case, the diameter of the cylindrical body can be adjusted to an appropriate value depending on the changing the diameter of the tire member, the changing the length of the bent-over portion or the like so as to prevent the quality of the already bent-over portion from becoming irregular due to the change. A low-pressure fluid is then introduced into the bladder to expand it to push and spread the portion in the radial direction of the tire forming drum. As a result, the outer end of the portion is pinched between the bladder and the cylindrical body. The cylindrical body is moved by the moving means toward the axially middle part of the tire forming drum. At that time, since the bladder is in tight contact with the cylindrical body and therefore cannot slip thereon, the bladder is deformed and moved while rolling. Since the outer end of the portion is pulled toward the axially middle part of the tire forming drum as the outer end remains pinched between the bladder and the cylindrical body, the portion of the tire member is gradually turned and bent over. Since the portion is pushed from inside by the internal pressure of the bladder during the bending-over work as the portion remains pinched between the cylindrical body and the bladder, a wrinkle extending in the portion in the circumferential direction of the tire member is smoothed out if any, so that the quality of the portion bent over is enhanced.

It will be understood from the above description that according to the present invention, the control of operation of tire formation is facilitated and a waiting time is eliminated to the efficiency of tire formation, and the cost of equipment is reduced.

What is claimed is:

1. A method of forming a tire comprising in sequence, the steps of:

pushing and spreading bending-over portions of a tire member wound on a tire forming drum by bladders to pinch the outer ends of said portions between said bladders and cylindrical bodies;

moving said bodies axially toward the middle part of said drum to bend over said portions around wire beads;

moving said bladders out from between said member and said bodies; and reducing diameters of said bodies to hold the already bent-over tire member on the peripheral surface of said drum and axially moving said bodies to convey said member axially from said drum.

* * * * *